E. SCHNEIDER.
AUTOMATIC IMMERSION REGULATOR FOR SUBMARINES AND TORPEDOES.
APPLICATION FILED NOV. 11, 1907.
904,093.
Patented Nov. 17, 1908.
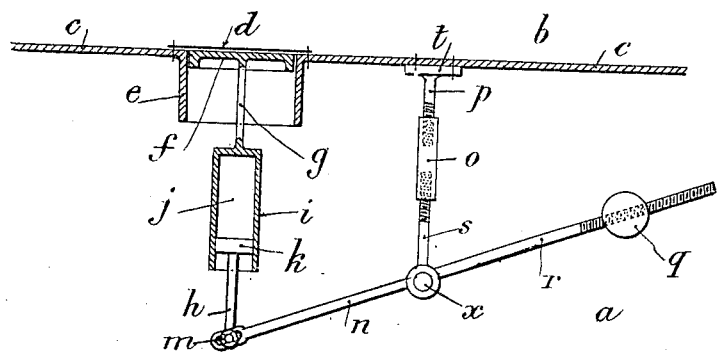

UNITED STATES PATENT OFFICE.

EUGÈNE SCHNEIDER, OF LE CREUSOT, FRANCE.

AUTOMATIC IMMERSION-REGULATOR FOR SUBMARINES AND TORPEDOES.

No. 904,093.  Specification of Letters Patent.  Patented Nov. 17, 1908.

Application filed November 11, 1907. Serial No. 401,691.

*To all whom it may concern:*

Be it known that I, EUGÈNE SCHNEIDER, citizen of the Republic of France, residing at Le Creusot, Saône-et-Loire, France, have invented certain new and useful Improvements in Automatic Immersion-Regulators for Submarines and Torpedoes, of which the following is a specification.

This automatic regulator has for its object to enable the submarine vessel or the torpedo on which it is installed to be navigated at a constant depth and inclination. Its principle is to oppose the thrusts produced upon a piston by the external pressure of the water by the component due to the weight of a mass adjustable in position, the connection between the piston and the weight being elastic if desired.

In the accompanying drawing the lower part of the submarine (or of the torpedo) is at $a$, the water is at $b$; the hull is represented by $c$. In the hull $c$ there is formed, preferably at the upper part, a cylinder $e$ in which the piston $f$ is capable of displacement. In order to insure a tight joint, the piston $f$ may be completed by the addition of an elastic membrane $d$ (of india rubber for example or of thin metal).

On the piston $f$ there is fixed a rod $g$ carrying a sheath $i$ into which a piston $k$ enters. The inner cavity $j$ of the sheath $i$ may be occupied either by a spring or by an elastic fluid or again by an incompressible material. On the piston $k$ there is fixed a rod $h$ jointed at $m$ on a lever $n$—$r$ capable of rocking at $x$ on a shaft carried by the pendent chair $p$—$o$—$s$. This pendent chair adjustable in length by means of the screw-threaded adjusting sleeve $o$, is fixed to the hull by a plate $t$. The extremity of the arm $r$ of the beam may be screw-threaded and carries a weight $q$ which is intended to balance the pressure upon the piston $f$.

If the submarine (or the torpedo) descends beyond the permissible depth, the pressure upon the piston $f$ exceeds the action of the weight $q$. If on the other hand the submarine becomes inclined, the action of the weight $q$ upon the piston $f$ varies. It is only necessary to connect a place on the rod $n$—$r$ with a controlling mechanism (electrical or otherwise) which controls the immersion rudder of the vessel (submarine or torpedo) in question.

When it is desired to change the inclination or the depth at which navigation is taking place, the following means may be employed, separately or simultaneously:—
1. Displace the weight $q$ upon the rod $r$ if this latter is screw-threaded or is provided with any other means for the displacement of the weight $q$. 2. Displace the point of articulation $x$ by means of the adjusting sleeve $o$ or by any other similar means. 3. In cases in which the cavity $j$ contains a spring or an elastic fluid, vary the tension of the spring or of this fluid. 4. In cases in which the cavity $j$ contains an incompressible material, vary the quantity of material contained in $j$. The direction of the lever $n$, $r$, to the support $p$, $o$, $s$, and connection $g$, $h$, may be varied as desired according to the object to be attained.

It will be seen that the apparatus described utilizes the variations of weight and those of the hydrostatic pressure, according to the inclination or the depth assumed by the submarine (or the torpedo) provided therewith, the connection between the mobile weight and the mobile piston being produced by an elastic member as desired.

What I claim and desire to secure by Letters Patent of the United States is:—

1. In an automatic immersion regulator for submarines and torpedoes, the combination of a piston cylinder supported by the hull of the submarine or torpedo, a piston therein subject to the pressure of the water on its outer face, a second piston cylinder having a rigid connection with said piston and containing a fluid subject to change in volume or pressure, a piston in said second cylinder, a lever having a jointed connection with said second piston, an adjustable hanger for supporting said lever, and an adjustable weight on said lever.

2. In an automatic immersion regulator for submarines and torpedoes, the combination of a lever having a support on which to oscillate, a piston subject to variations in hydrostatic pressure of the water, an extensible connection between said piston and lever, and a weight on said lever tending to oppose said hydrostatic pressure.

3. In an automatic immersion regulator for submarines and topedoes, the combination of a lever having a support on which to oscillate, a piston subject to variations in hydrostatic pressure of the water, an extensible connection between said lever and piston, a weight on said lever tending to oppose said hydrostatic pressure, and means for varying the angular relation of the lever to the direction of the said opposing forces.

In testimony whereof I have affixed my signature in presence of two witnesses.

EUGÈNE SCHNEIDER.

Witnesses:
CHARLES DE LAGRANGE,
H. C. COXE.